(12) United States Patent
DeFrank et al.

(10) Patent No.: US 6,936,126 B2
(45) Date of Patent: Aug. 30, 2005

(54) METHOD OF MANUFACTURE OF A DRIP IRRIGATION HOSE

(75) Inventors: Michael DeFrank, Temecula, CA (US); David Marchetti, San Diego, CA (US); David L. Teegardin, San Diego, CA (US)

(73) Assignee: T-Systems International, Inc., San Diego, CA (US)

( * ) Notice: Subject to any disclaimer, the term of this patent is extended or adjusted under 35 U.S.C. 154(b) by 100 days.

(21) Appl. No.: 10/192,959

(22) Filed: Jul. 11, 2002

(65) Prior Publication Data

US 2002/0174944 A1 Nov. 28, 2002

Related U.S. Application Data

(63) Continuation of application No. 09/128,770, filed on Aug. 4, 1998, now Pat. No. 6,464,816, which is a division of application No. 08/850,407, filed on May 2, 1997, now Pat. No. 5,865,377, which is a continuation-in-part of application No. 08/650,469, filed on May 20, 1996, now Pat. No. 5,634,595, which is a continuation of application No. 08/279,813, filed on Jul. 19, 1994, now Pat. No. 5,522,551.

(51) Int. Cl.[7] ............................................. B29C 53/48
(52) U.S. Cl. ...................................... 156/203; 156/252
(58) Field of Search ................................ 156/203, 252, 156/466, 513; 237/542, 533.3; 83/332, 343, 425, 676, 30, 57, 331

(56) References Cited

U.S. PATENT DOCUMENTS

| | | | |
|---|---|---|---|
| 3,320,109 A | 5/1967 | Braner | |
| 3,532,586 A | 10/1970 | Haurey, et al. | |
| 3,899,135 A | 8/1975 | O'Brien | |

(Continued)

FOREIGN PATENT DOCUMENTS

| | | |
|---|---|---|
| DE | A 2508865 | 9/1976 |
| JP | 53-107940 | 9/1978 |

OTHER PUBLICATIONS

Letter from Michael J. Keenan, Esq., of the law firm of Nixon & Vanderhye P.C., regarding U.S. Patent No. 5,865,377, two pages, May 3, 1999.
Hardie Irrigation Product Information Sheet.
IL 46,345; Dec. 1974.
IL 50,051; Nov. 1979.
IL 52,184; May 1977.
IL 52, 184; May 1977.

*Primary Examiner*—Sam Chuan Yao
*Assistant Examiner*—Barbara J. Musser
(74) *Attorney, Agent, or Firm*—Christie, Parker & Hale, LLP

(57) ABSTRACT

A drip irrigation hose of the continuous emitter type in which the outlets from the regulating passage each comprise a single longitudinal slit. By controlling the length of the slits and the flexibility of the film, water drips from the outlets when the hose is pressurized without clogging when the hose is depressurized. The slits are sufficiently long and the film is sufficiently flexible so the water drips from the outlets when the hose is pressurized. The slits are sufficiently short and the film is sufficiently rigid so the outlets close completely when the hose is depressurized. An outlet forming wheel has a knife blade on its periphery. A backing wheel engages the outlet forming wheel to establish a first nip therebetween. The backing wheel has on its periphery a circumferential slot into which the knife blade fits at the first nip. A rib forming wheel has around its periphery impressions that define a desired track pattern for the ribs. The outlet forming wheel and the rib forming wheel are mounted on a common shaft to operate in synchronism. A continuous strip of plastic film is directed in a path that reverses direction four times to accommodate these wheels.

7 Claims, 5 Drawing Sheets

U.S. PATENT DOCUMENTS

| | | | |
|---|---|---|---|
| 3,952,637 A | * 4/1976 | Lambert et al. | 493/30 |
| 4,053,109 A | 10/1977 | Gilead | |
| 4,139,159 A | 2/1979 | Inuoue et al. | |
| 4,167,884 A | * 9/1979 | Santanna | 83/671 |
| 4,195,784 A | 4/1980 | Gilead | |
| 4,204,447 A | * 5/1980 | Slaughterbeck | 83/171 |
| 4,247,051 A | 1/1981 | Allport | |
| 4,548,360 A | 10/1985 | Delmer et al. | |
| 4,572,452 A | 2/1986 | Driscoll et al. | |
| 4,642,152 A | 2/1987 | Chapin | |
| 4,779,800 A | 10/1988 | Tuomi | |
| 4,850,947 A | 7/1989 | Brown et al. | |
| 4,859,264 A | 8/1989 | Buluschek | |
| 4,984,739 A | 1/1991 | Allport | |
| 5,076,498 A | * 12/1991 | Townsend | 239/542 |
| 5,123,984 A | 6/1992 | Allport et al. | |
| 5,144,874 A | * 9/1992 | Garrett | 83/332 |
| 5,375,770 A | 12/1994 | Roberts | |
| 5,522,551 A | * 6/1996 | DeFrank et al. | 239/542 |
| 5,584,952 A | 12/1996 | Rubenstein et al. | |
| 5,634,595 A | * 6/1997 | DeFrank et al. | 239/542 |
| 5,806,188 A | 9/1998 | Caraballo | |
| 6,464,816 B1 | * 10/2002 | DeFrank et al. | 156/203 |

* cited by examiner

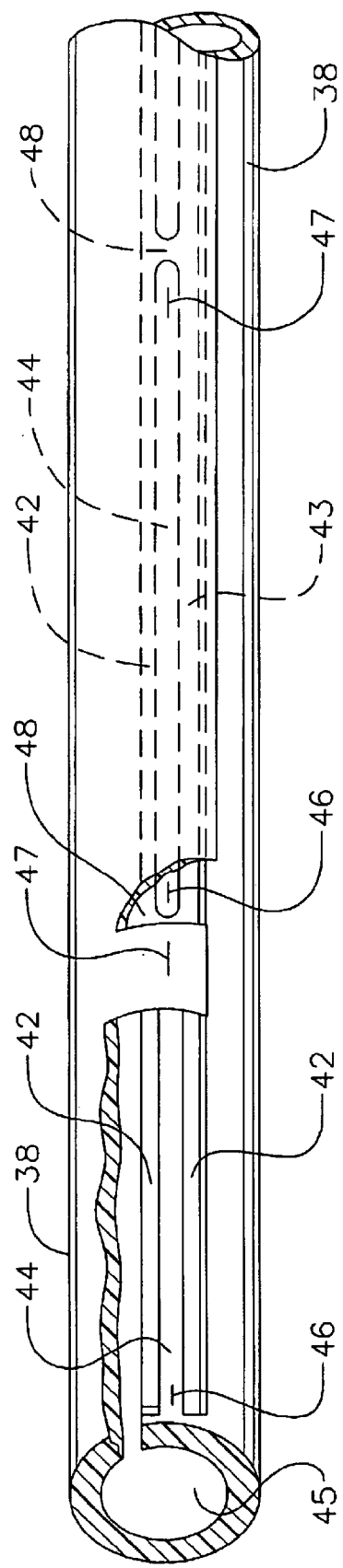

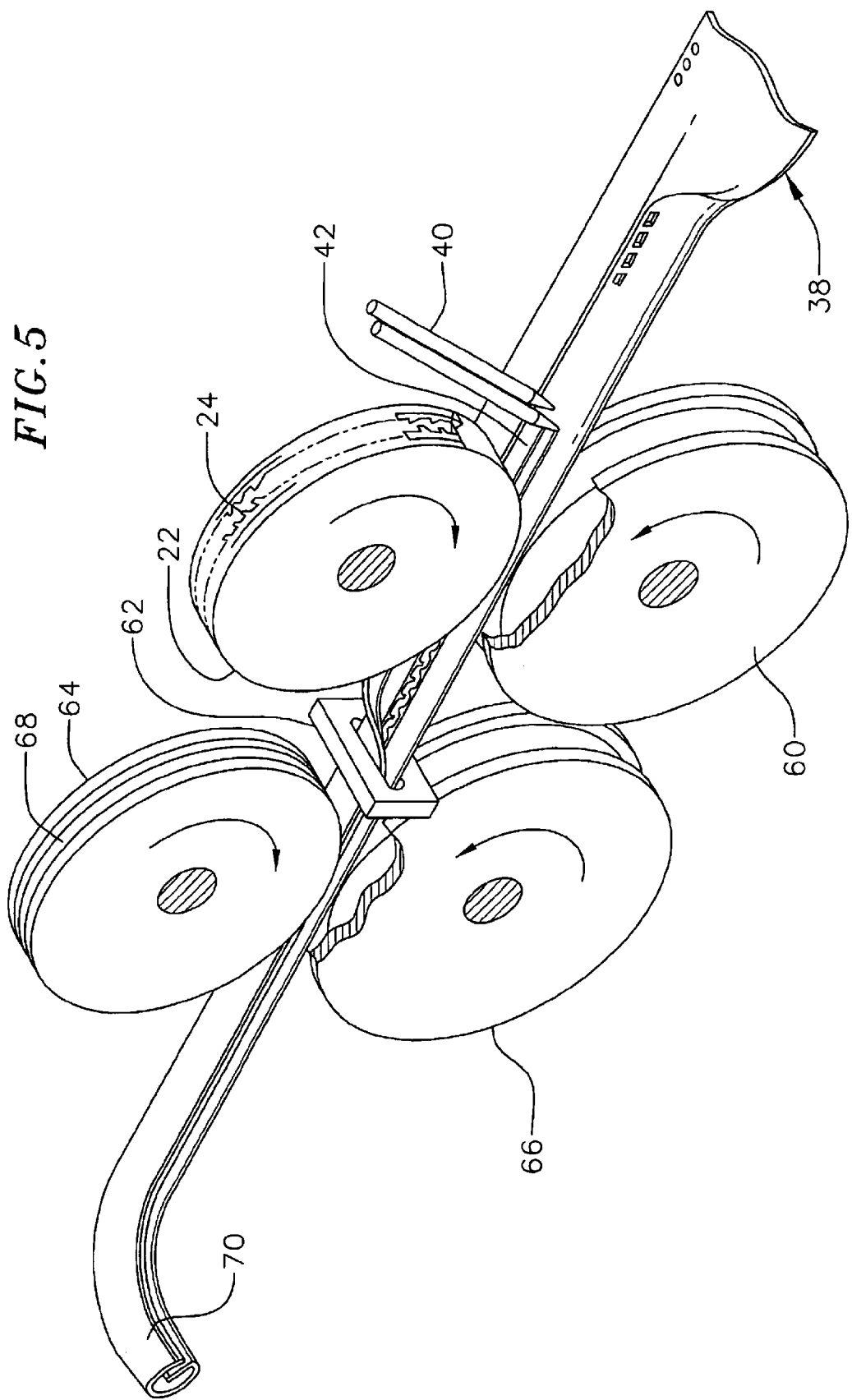

METHOD OF MANUFACTURE OF A DRIP IRRIGATION HOSE

CROSS-REFERENCE TO RELATED APPLICATIONS

This application is a continuation of application Ser. No. 09/128,770, filed Aug. 4, 1998, now U.S. Pat. No. 6,464,816, which is a divisional of application Ser. No. 08/850,407, filed May 2, 1997, which issued as U.S. Pat. No. 5,865,377 on Feb. 2, 1999, which is a continuation-in-part of application Ser. No. 08/650,469, filed May 20, 1996, which issued as U.S. Pat. No. 5,634,595 on Jun. 3, 1997, which is a continuation of application Ser. No. 08/279,813, filed Jul. 19, 1994, which issued as U.S. Pat. No. 5,522,551 on Jun. 4, 1996.

BACKGROUND OF THE INVENTION

This invention relates to drip irrigation and, more particularly, to a drip irrigation hose with an improved outlet construction and a method for its manufacture.

Drip irrigation hose can be classified into two types—hose having discrete emitters and hose having continuous, integral emitters. An example of a drip irrigation hose having discrete emitters is shown in U.S. Pat. No. 4,850,531. An example of a drip irrigation hose continuous, integral emitters is shown in U.S. Pat. No. 4,247,051. Drip irrigation hose having continuous integral emitters offers the possibility of lower cost and ease of manufacture and installation.

The design of the inlets to and outlets from the emitters is critical. If the effective outlet area of the emitters is too large, dirt and debris can collect externally in the outlets, thereby causing external clogging. If the effective inlet and outlet areas of the emitters are too small, they become clogged internally and cease to serve their purpose. Further, if the effective outlet areas of the emitters are too small, water squirts out of the hose instead of dripping, and soil erosion results.

U.S. Pat. No. 4,247,051 discloses a drip irrigation hose formed by bending a strip plastic film along its length to form an overlapping longitudinal seam between opposing longitudinal margins of the film. First and second longitudinally extending, laterally spaced, transverse ribs interconnect the opposing margins along their length to seal the overlapping longitudinal seam. The ribs are formed by one or more molten plastic beads extruded onto the film. As a result, a flow regulating passage is defined by the ribs and the opposing margins and a supply passage is defined by the remainder of the film. Water flows from the supply passage to the flow regulating passage through a plurality of longitudinally spaced inlets. Water flows from the flow regulating passage to the exterior of the hose through a plurality of longitudinally spaced outlets longitudinally spaced from the respective inlets to provide a substantial path length from each inlet to a respective outlet. In one embodiment, the outlets each comprise two parallel slits that form between them a flexible flap. The flap serves as an outlet valve, opening and closing as the hose is pressurized and depressurized. However, unless the plastic film is very thick and rigid, the flaps do not close consistently when the hose is depressurized and therefore, the outlets can become clogged by soil drawn into the slits.

A problem encountered in the manufacture of continuous emitter drip irrigation hose is coordinating the position of the outlets and the track pattern of the ribs. If care is not taken, the track pattern of the ribs may overlap the outlets, and thereby cause the outlets to be on the high pressure side of the flow regulating passages.

SUMMARY OF THE INVENTION

One aspect of the invention is a drip irrigation hose of the continuous emitter type in which the outlets from the regulating passage each comprise a single longitudinal slit. By controlling the length of the slits and the flexibility of the film, water drips from the outlets when the hose is pressurized without clogging when the hose is depressurized. The slits are sufficiently long and the film is sufficiently flexible so the water drips from the outlets when the hose is pressurized. The slits are sufficiently short and the film is sufficiently rigid so the outlets close completely when the hose is depressurized.

Another aspect of the invention is a method for making a drip irrigation hose having longitudinal single slit outlets and/or inlets. A first outlet and/or inlet forming wheel has one or more knife blades on its periphery. A second backing wheel engages the first wheel to establish a first nip therebetween. The backing wheel has on its periphery a circumferential slot into which the knife blade fits at the first nip. A third rib forming wheel has around its periphery impressions that define a desired track pattern for the ribs. A second nip is established with a third wheel in which the desired track pattern is formed. The first and second wheels are mounted on a common shaft to operate in synchronism. A continuous strip of plastic film is directed in the following path in the order recited. The film is wrapped around the second wheel to reverse direction and pass into the first nip, thereby forming the outlet slits. The direction of the film is reversed leaving the first nip to transport the film toward the first wheel. The film is wrapped around a portion of the periphery of the first wheel spaced laterally from the knife blade to reverse direction. The direction of the film is reversed to transport the film toward the third wheel. The film is transported under an extruder to deposit a bead of molten plastic on the film before the third wheel. The film is transported into the second nip to form the desired track in the molten plastic. After the film leaves the third wheel, the hose is finished. The described method forms the outlet slits and the track pattern in a coordinated fashion. As a result, the outlets are not restricted or plugged by the ribs.

BRIEF DESCRIPTION OF THE DRAWINGS

The features of specific embodiments of the best mode contemplated of carrying out the invention are illustrated in the drawings, in which:

FIG. 4 is a side partially cutaway view of a length of drip irrigation hose incorporating the principals of the invention.

FIG. 5 is a schematic diagram of apparatus for completing the manufacture of a drip irrigation hose following the operations shown in FIG. 2.

DETAILED DESCRIPTION OF THE SPECIFIC EMBODIMENT

The disclosures of U.S. Pat. Nos. 4,247,051, 4,984,739 and 5,123,984 are incorporated fully herein by reference.

Figure 1:
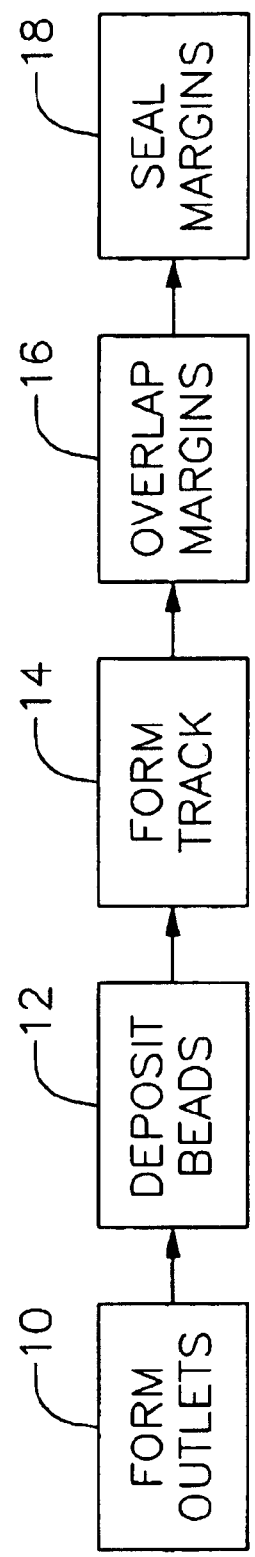
FIG. 1 is a schematic block diagram of the method for making a drip irrigation hose of the continuous emitter type.

The drip irrigation hose of the invention is made from a continuous strip of flexible, water impervious plastic film, generally ranging in thickness between 4 and 15 mil. As depicted by block 10 in FIG. 1, outlets and/or inlets are formed in the strip of film along one margin. As described in more detail below, each outlet and/or inlet comprises a single longitudinal slit in the film. Next, as depicted by block 12, two molten plastic beads made of material compatible with the film are deposited by an extruder on the margin of the film on either side of the outlet slits.

Next, as depicted by block 14, the track pattern of the ribs is formed in the molten beads by a rib forming wheel. The track pattern is repeated each time the rib forming wheel completes a revolution. As depicted by block 16, after the ribs are formed, the margins of the film are overlapped to position between them the track pattern. Finally, as depicted by block 18, the overlapping margins are sealed by the still molten ribs to form the finished hose. The described steps, except for formation of the outlets and/or inlets, are shown in more detail in the referenced '984 patent. Alternatively, either the inlets or the outlets could be formed as interruptions in one of the ribs.

Figure 2:
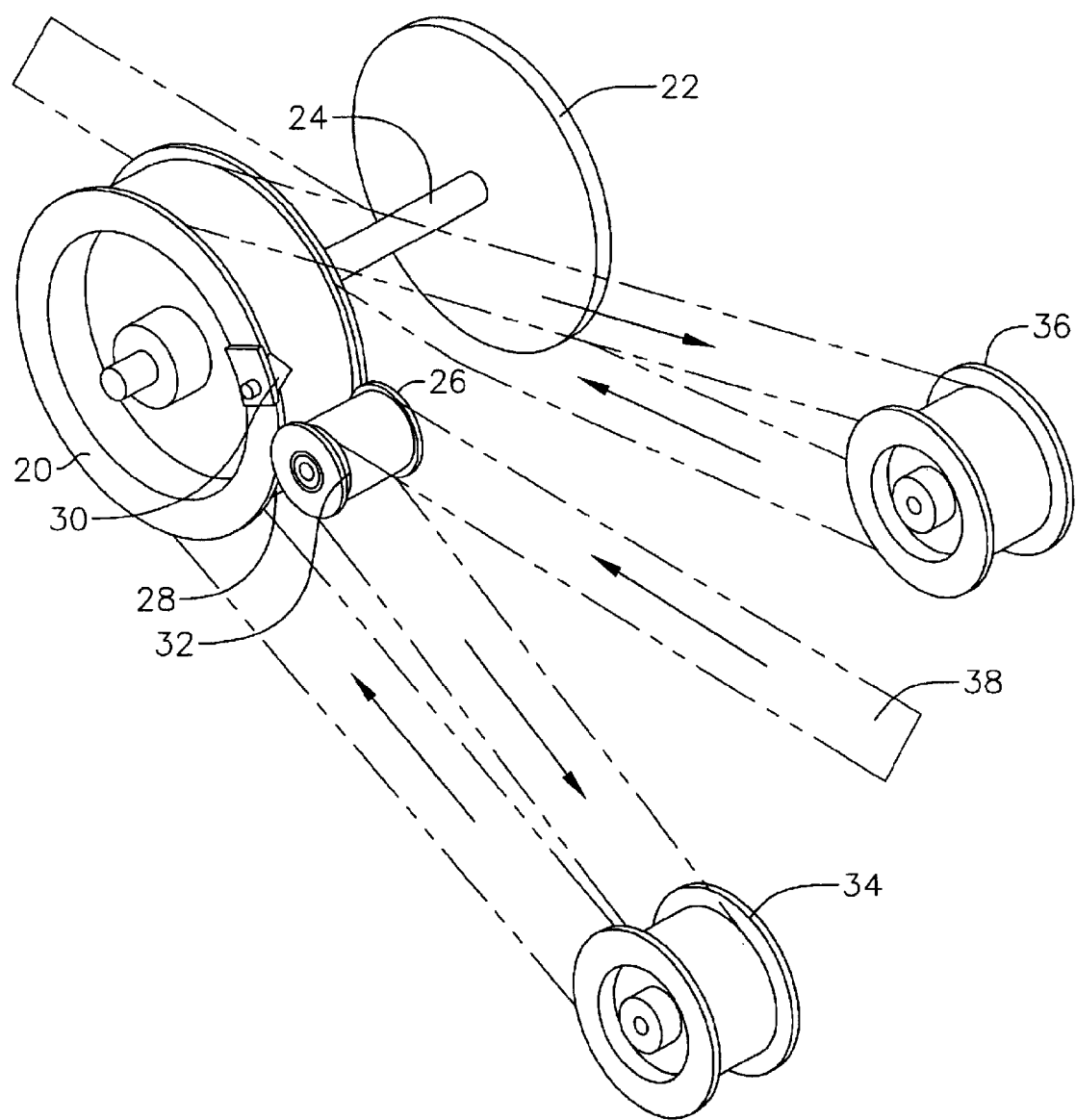
FIG. 2 is a schematic view of a portion of the film path for making a drip irrigation hose in accordance with the invention.

FIG. 2 illustrates the path of a continuous strip of film 38 from which the drip irrigation hose is made between the formation of the outlets and/or inlets (block 10) and the formation of the track pattern (block 14). An outlet forming wheel 20 and a rib forming wheel 22 are mounted on a common shaft 24 to synchronize their operation. Wheels 20 and 22 have the same diameter. A backing wheel 26 engages outlet forming wheel 20 to establish a nip 28 therebetween. A knife blade 30 is mounted on the periphery of wheel 20. Wheel 26 has a circumferential slot 32 into which knife blade 30 fits at nip 28. Direction changing wheels 34 and 36 also define part of the film path. Wheels 20, 22, 26, 34, and 36 have flanges to guide film 38 laterally during the manufacturing operation.

Wheel 22 has, around its periphery, impressions that define the desired track pattern 24, for example, one of the track patterns shown in the '051 patent or in the '739 patent. The direction of movement of film 38 is depicted by the arrows in FIG. 2. Film 38 is wrapped around wheel 26 to reverse direction and pass into nip 28. As a result, a slit is formed in film 38 each time blade 30 passes into nip 28. A slit is formed each time wheel 20 completes one revolution. After leaving wheel 26, film 38 is wrapped around wheel 34 to reverse direction and return toward wheel 20. Film 38 is wrapped around a portion of the periphery of wheel 20, spaced laterally from knife blade 30, to reverse direction. After leaving wheel 20, film 38 is wrapped around wheel 36 to reverse direction and move toward wheel 22. Wheel 36 could be canted slightly to provide a smooth transition in the film path between wheels 20 and 22, and the film could twist slightly between wheels 36 and 22. Between wheels 36 and 22, film 38 passes under an extruder 40 which deposits one or more molten plastic beads on one margin of film 38. Since wheels 20 and 22 are mounted on a common shaft, the formation of the outlets and the track pattern is coordinated and their relative positioning is closely controlled. After leaving wheel 22, film 38 is finished in the manner illustrated in FIG. 5. More specifically, as film 38 approaches extruder 40, its inner margin is folded over and extruder 40 forms one or more beads 42 on the exposed surface of the inner margin of film 38. A backing wheel 60 underlies wheel 22, which has track pattern 24. After passage through the nip formed by wheels 22 and 60, the outer margin of film 38 is folded by a guide 62 to overlap the inner margin of film 38. The folded film 38 then passes through the nip of a form wheel 64 and a backing wheel 66. Form wheel 64 has a groove 68 that depresses the beads to set the bead height at a specified value. The value of the bead height determines the flow rate of the hose. A finished hose 70 leaves the nip between wheels 66 and 68. In a typical embodiment, the diameters of wheels 20 and 22 would be about from 3 to 6 inches, the diameter of wheel 26 would be about 4 inches, the diameters of wheels 34 and 36 would be about 4 inches, and the distance between wheels 22 and 36 would be about 24 inches.

If the inlets also comprise slits another knife blade is mounted on the periphery of wheel 20 laterally spaced from knife blade 30 and wheel 26 has another circumferential slot laterally spaced from slot 32 into which the other knife blade fits. The inlets as well as the outlets are formed as the respective knife blades pass into nip 28.

Figure 3:
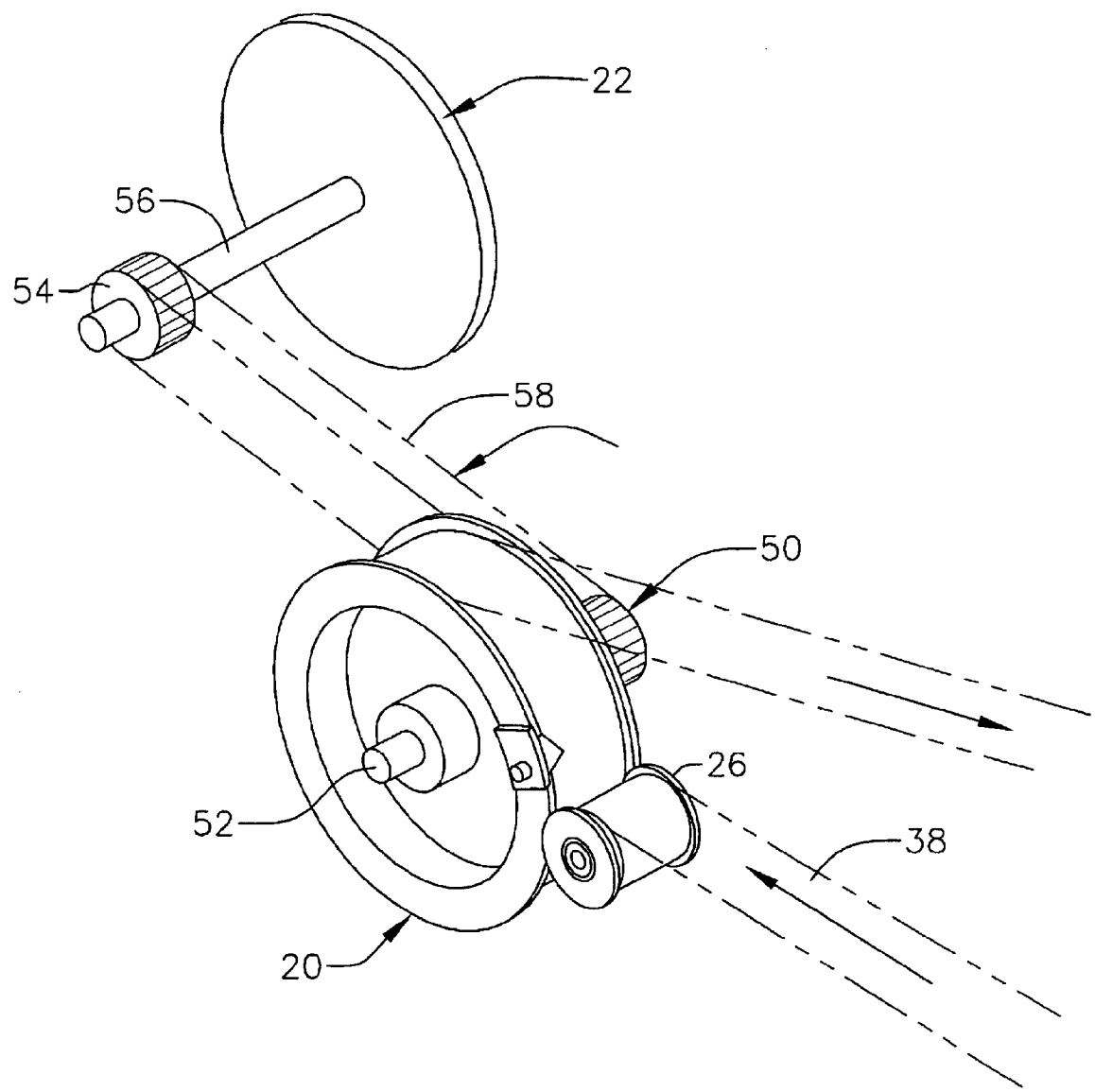
FIG. 3 is a schematic view of a portion of the film path in an alternative embodiment to the film path of FIG. 2.

FIG. 3 illustrates an alternative film path arrangement that permits wheels 20 and 22 to have different diameters so that the outlet spacing can be greater than the track pattern length, which produces a skip in the outlet configuration. Wheel 20 and a toothed wheel 50 are mounted on a shaft 52. Wheel 22 and a toothed wheel 54 are mounted on a shaft 56. A toothed belt 58 couples wheels 50 and 54 to synchronize the rotation of wheels 20 and 22 in a ratio to cause the desired skip in the outlet spacing relative to the track pattern length. In short toothed wheels 50 and 54 and toothed belt 58 replace shaft 24 in the embodiment of FIG. 2. The diameters of wheels 20, 22, 50, and 54 are selected so the angular velocity of wheel 22 is a multiple of the angular velocity of wheel 20, depending upon the desired outlet skip. As a result, the same rib forming wheel 22 can be used to produce a variety of outlet spacings, i.e., skipped outlet configurations.

In FIG. 4, the completed drip irrigation hose is shown. Strip 38 is bent along its length to form an overlapping longitudinal seam between an interior margin and an exterior margin of the strip. Spaced apart, transverse ribs 42 and 43 extend longitudinally through the seam to connect the margins of strip 38, forming a seal and a flow regulating passage 44 therebetween. A water supply passage 45, having a much larger cross-section area then flow regulating passage 44 is defined by the remainder of strip 38. Longitudinally spaced apart slits 46 in the portion of strip 38 between supply passage 45 and flow regulating passage 44 serve as inlets to flow regulating passage 44. Longitudinally spaced apart slits 47, formed in the exterior margin of strip 38, serve as outlets from the hose. Slits 47 are displaced from the respective slits 46 to provide a substantial path length from each inlet to a respective outlet. Preferably, cross ribs 48 are employed to divide the flow regulating passage into segments, such that slit 46 is at one end of the segment and a slit 47 is at the other end of a segment. Alternatively, the inlets could be formed by interruptions in rib 42 as illustrated in FIGS. 5 and 6 of the '051 patent and as illustrated in the '739 patent. The shape of ribs 42, 43 and 48 are determined by the track pattern on wheel 22 (FIG. 2). Preferably, chevrons are formed on the adjacent interior surfaces of ribs 42 and 43 to create turbulent flow in the flow regulating passage as illustrated in the '739 patent.

By controlling the length of the slits and the flexibility of the film, water drips from the outlets when the hose is pressurized without clogging when the hose is depressurized. Typically, the line pressure of the water used for crop irrigation ranges from about 4 psig to 14 psig. Slits 47 are sufficiently long and strip 38 is sufficiently flexible so the water drips from the outlets when the hose is pressurized, rather than squirting. The effective area of the outlets remains small because the material on both sides of the slits remain in the same plane, rather than buckling. If the slits are too short or the strip is too rigid, the material on either side of the slits does not move sufficiently to make a large hole when the hose is pressurized and water squirts out the hose and erodes the soil. Slits 47 are sufficient short and strip 38 is sufficiently rigid so the outlets close completely when the hose is depressurized. If the slits are too long or the strip is too flexible, the slits do not close when the hose is depressurized. Typically, the slits are about ¼ inch for a 4 mil film thickness and the slits are about ⅜ inch for a 15 mil film thickness. Thus, if the slits are much shorter than about ¼ inch for a 4 mil film thickness or if the film is much thicker than about 4 mil for a slit length of about ¼ inch, the water may squirt from the outlets. Similarly, if the slits are much longer than about ⅜ inch for a 15 mil film thickness or if the film is much thinner than about 15 mil for a slit length of about ⅜ inch, the outlets may not close after the hose is depressurized.

Despite the foregoing, it has recently been discovered that with a slit length of almost one inch, the outlets still close after the hose is depressurized if the film is flexible enough.

The described embodiment of the invention is only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. A method for making drip irrigation hose comprising:

rotating an outlet forming wheel having a knife blade on its periphery;

positioning a backing wheel to engage the outlet forming wheel and establish a nip, the backing wheel having a circumferential slot into which the knife blade fits as the outlet forming wheel rotates;

moving a strip of plastic film through the nip to form single slit outlets repeatedly along the strip as the knife blade rotates;

forming on the strip an elongated flow regulating passage; and forming inlets to the flow regulating passage that are spaced from the outlets to form a substantial path length from each inlet to a corresponding outlet, wherein the outlets couple the flow regulating passage to the exterior of the hose.

2. The method of claim 1, wherein the strip of plastic film has first and second margins, and wherein the method further comprises overlapping and sealing the first and second margins to form a tube from the strip of plastic film.

3. The method of claim 2, wherein the flow regulating passage lies between the overlapping margins.

4. The method of claim 1, wherein the step of forming a flow regulating passage overlaps and seals margins of the strip between the inlets and the outlets, wherein the outlets couple the flow regulating passage to the exterior of the hose.

5. The method of claim 1, in which the outlet forming wheel is rotated such that the knife blade forms slits that close completely when the hose is depressurized.

6. The method of claim 5, in which the strip is flexible, additionally comprising partially wrapping the strip around one of the wheels as the strip moves through the nip.

7. The method of claim 1, in which the strip is flexible, additionally comprising partially wrapping the strip around one of the wheels as the strip moves through the nip.

* * * * *